(12) United States Patent
Jankowski et al.

(10) Patent No.: US 8,953,295 B2
(45) Date of Patent: Feb. 10, 2015

(54) PROTECTION SYSTEM FOR AN IT ELECTRICAL DISTRIBUTION SYSTEM HAVING A FLOATING REFERENCE CONDUCTOR

(75) Inventors: David Paul Jankowski, Manoona (AU); Geoffrey Rubython, Mayfield (AU); Wayne Callen, Redhead (AU); Walter Henry Berryman, Inverloch (AU)

(73) Assignee: IEP2 Research Pty Limited (AU)

( * ) Notice: Subject to any disclaimer, the term of this patent is extended or adjusted under 35 U.S.C. 154(b) by 794 days.

(21) Appl. No.: 13/140,756

(22) PCT Filed: Dec. 21, 2009
(Under 37 CFR 1.47)

(86) PCT No.: PCT/AU2009/001679
§ 371 (c)(1),
(2), (4) Date: Jun. 20, 2012

(87) PCT Pub. No.: WO2010/069012
PCT Pub. Date: Jun. 24, 2010

(65) Prior Publication Data
US 2013/0342948 A1 Dec. 26, 2013

(30) Foreign Application Priority Data

Dec. 19, 2008 (AU) ................................ 2008906556
Dec. 22, 2008 (AU) ................................ 2008906566

(51) Int. Cl.
*H02H 9/02* (2006.01)
*H02H 3/32* (2006.01)
(52) U.S. Cl.
CPC .. *H02H 9/02* (2013.01); *H02H 3/32* (2013.01)
USPC ....................................................... 361/93.9
(58) Field of Classification Search
USPC .................................................. 361/42, 93.9
See application file for complete search history.

(56) References Cited

U.S. PATENT DOCUMENTS 5,475,327 A  12/1995  Wu et al.
5,510,945 A   4/1996  Taylor et al.
(Continued)

FOREIGN PATENT DOCUMENTS

CN       1716723      1/2006
CN     201066780      5/2008
(Continued)

OTHER PUBLICATIONS

Chinese Office Action for CN 200980157234.4, English translation attached to original, Dated Dec. 2, 2013, All together 16 Pages.
(Continued)

*Primary Examiner* — Jared Fureman
*Assistant Examiner* — Kevin J Comber
(74) *Attorney, Agent, or Firm* — Brooks Kushman PC

(57) ABSTRACT

A protection system for an IT electrical distribution system (EDS) has a floating reference conductor and two electrical conductors in the form of an active conductor and a neutral conductor. System includes two input terminals for electrically connecting to an MEN electrical power source that is upstream of system. Two output terminals are electrically connected to an electrical load in the form of an electrical motor for a compressor of an upright freezer display. Motor is downstream of the system. A protection device, in the form of an MCB, electrically connects terminals to allow a supply of electrical power from source to motor. MCB is responsive to a fault signal at a port for selectively electrically disconnecting at least one of terminals to prevent the supply of electrical power. A sentinel unit selectively generates the fault signal at port in response to the current in conductor being greater than a predetermined threshold.

15 Claims, 11 Drawing Sheets

(56) References Cited

U.S. PATENT DOCUMENTS

| | | | |
|---|---|---|---|
| 6,437,951 B1 | 8/2002 | Ahlstrom et al. | |
| 2005/0207075 A1* | 9/2005 | Callen et al. | 361/42 |
| 2006/0133001 A1 | 6/2006 | Van Den Berg et al. | |

FOREIGN PATENT DOCUMENTS

| | | |
|---|---|---|
| GB | 2004144 A | 3/1979 |
| WO | 9926328 A1 | 5/1999 |
| WO | 2008153579 A1 | 12/2008 |

OTHER PUBLICATIONS

Yang et al. Building Electricity 2002, vol. 1, English translation attached to original, All together 16 Pages. "Design and Discussion of Operating Room Power Distribution and Insulation Monitoring System."

International Search Report and Written Opinion for PCT/AU2009/001679, Both completed by the Australian Patent Office on Feb. 19, 2010, 10 Pages all together.

Earthing system retrieved from the internet http://en.wikipedia.org/w/index.php?title=Earthing_system&oldid=257429804, Published on Dec. 12, 2008 as per History page on Wikipedia 8 Pages.

http://shop.pulset.com/catalogue/c8/c360/p932, Retrieved Jul. 26, 2011, 2 Pages.

http://shop.pulset.com/catalogue/c8/c360/p933, Retrieved Jul. 27, 2011, 2 Pages.

* cited by examiner

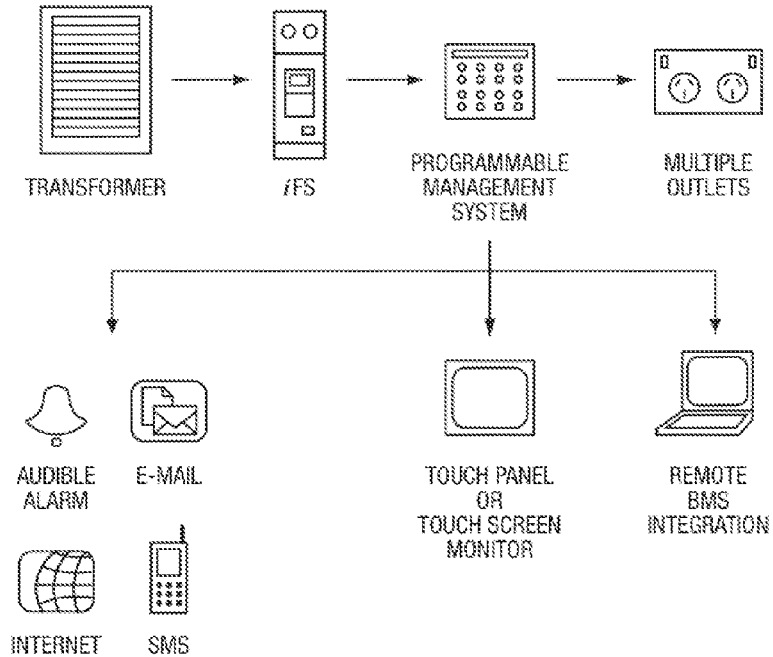

Figure 12

| SPECIFICATION | RCD (Prior Art) | Embodiment | GFCI (Prior Art) |
|---|---|---|---|
| Isolation speed ms | 10-40 Avg | 5 constant | 25 Avg |
| Isolation milliamps | 10-30 Avg | 5 constant | 5 |
| Fault type detection | Current to earth | Voltage to frame | Current to ground |
| Operating voltage range | 192-264 | 88-264 | 88-121 |
| Operating temperature | -10 - +47° | -10 - +77° | -10 - +47° |
| Maximum circuit load | 63A | 63A | 63A |
| Internal circuit isolation | 6ka | 6ka | 6ka |
| Self testing | No | Yes | No |
| Input voltage detection | 240 | 110 / 240 | 110 |
| Frequency | 50Hz | 50/400Hz | 60Hz |

Figure 13

PROTECTION SYSTEM FOR AN IT ELECTRICAL DISTRIBUTION SYSTEM HAVING A FLOATING REFERENCE CONDUCTOR

CROSS-REFERENCE TO RELATED APPLICATION

This application is the U.S. national phase of PCT Appln. No. PCT/AU2009/001679 filed Dec. 21, 2009 which claims priority to Australian application 2008906556 filed Dec. 19, 2008, and Australian application 2008906566 filed Dec. 22, 2008, the disclosures of which are incorporated in their entirety by reference herein.

FIELD OF THE INVENTION

The present invention relates to a protection system and in particular to a protection system for an IT electrical distribution system having a floating reference conductor.

Embodiments of the invention have been developed particularly for a protection system for an IT electrical distribution system having a floating reference conductor and at least two electrical conductors for supplying electrical power from a source, and will be described herein with reference to that application. It will be appreciated, however, that the invention is not limited to such a field of use, and is applicable in broader contexts.

BACKGROUND

Any discussion of the background art throughout the specification should in no way be considered as an admission that such art is widely known or forms part of common general knowledge in the field.

In more than the one hundred years that electrical energy has been distributed to household installations and industrial installations, there has been a continuing development and improvement of safety. Initially, the main safety hazard posed by an electrical distribution system (EDS) was fire. As the electrical distribution systems developed the distribution voltages also increased, and the danger of electrocution and electrical shock, particularly when AC voltages were used, became another major concern.

The electrical distribution systems in all industrialized countries, and in particular low voltage (LV) networks and household installations, are earthed for safety reasons. The intention of such "earthing" is to allow the use of electrical protection devices as part of the distribution system to protect against electric shock and electrocution. The electrical protection devices provide "electrical protection" which, in LV networks is required to perform two major functions:
  The prevention of electrocution or serious electric shock to personnel who come into direct or indirect contact with live electric conductors.
  Following the failure of any electrical insulation of equipment being supplied electrical power by the distribution system, the prevention of: damage to electrical equipment; and possible fire ignition.

Given the above, various earthing systems have been developed over the last century. The three main types of earthing systems recognized internationally are:
  TT system: where T is indicative of a direct connection of one point to earth. That is, an "earth-earth" system.
  TN system: where T is indicative of a direct connection of one point to earth; and N is indicative of a neutral. That is, an "earth-neutral" system.
  IT system: where T is indicative of a direct connection of one point to earth; and I is indicative of all live parts being isolated from earth. That is, an "isolated from earth" system.

A more detailed description of these power supply systems with earth connections can be found in the IEC 60364-1: 2005 Standard.

The terms "IT system" or "IT network" are used interchangeably within this specification, unless for any given occurrence the context clearly indicates to the contrary, to refer to an earthing methodology for an electrical distribution system or an electrical distribution system using that earthing methodology. Where reference is made in this specification to an information technology system or network, use is made of the abbreviation "an IT&T system" or "an IT&T network".

In a number of industrialized countries the TN system is used widely. The earth path or exposed conductive parts are supplemented by connection to the distribution neutral. This is called the multiple earthed neutral system or, more usually, the MEN system. This system utilizes the supply utility neutral to improve—that is, to reduce—the earth path resistance. An earth stake included at an electrical installation is connected to the utility neutral at the installation switchboard and the utility neutral is also connected to earth at regular intervals along its path to the substation transformer. In TN systems the integrity of the earthing of the installation depends on the reliable connection of the earth stake.

An insulation fault in a TN system turns into a short circuit fault, and the fault has to be removed by pre-installed protection devices. The typical protection devices used are residual current devices (RCDs).

While the modern approach in TN systems to personnel and equipment safety protection is to use a low resistance earth connection between the source (the supply utilities) and the load (the household installation), the often large earth resistance variation at different locations within the distribution system and the installation provides varying levels of protection to personnel and equipment. In some cases the general mass of earth may have inherently high resistance—such as when the earth stake is in dry sandy soil or sandstone—which will inherently and undesirably increase the earth resistance.

TN (or MEN) networks are often considered a cheap and reliable mechanism for the delivery of power from a source of production to a point of consumption. However these networks are not without risk. For example, even in a relatively low population centre such as Australia each year tens of people die from exposure to electricity. It is also the case that TN systems are prohibited in certain military and mining installations involving explosives or other volatile materials due to the risk of detonation posed by such networks. Also a TN network, due to having extremely high fault currents, is susceptible, when a fault occurs, to giving rise to fire damage or other thermal damage. Environmentally, a TN network produces more electrical noise than other networks, primarily due to the harmonics generated. It is usually the $3^{rd}$ harmonic that is most problematic, and which proves very expensive to moderate or obviate. The evidence arising out of the Australian experience with TN networks indicates that that electrical faults contribute to:
  10% of all building fires.
  1000's of hospital admissions from electrical shocks.
  10,000's of damaged and destroyed electrical appliances.

There are two types of faults that are most common in TN systems. Both fault types are "earth faults" in that the fault current path is between the active conductor and earth. These two types are:

A short circuit fault: where the fault path electrical impedance is low and the resulting fault current extremely high. These high fault currents should trigger the over-current protection quickly and limit the potential for fire generation and for significant equipment damage.

A high impedance fault: where the fault path electrical impedance is high and the fault current relatively low. These low currents may be below the tripping level of any installed over-current protection and can persist for long periods of time without detection, ultimately giving rise to risks of arcing and thermal damage.

The second of these, the high impedance fault, is the most hazardous type in terms of potential equipment damage, even though the fault current is lower.

As the great majority of fault types that cause electric shock and electrocution are "earth faults", involving a fault path between active conductor and earth. One partial solution is to make use of an IT system. Such as system is also referred, in general terms, as an unearthed system or a system having electrical separation—for example, see Australian and New Zealand standard AS/NZS 3000:2007-7.4.1. An IT system is recognized by International and Australian standards as a possible means of providing protection against electric shock and electrocution caused by "earth faults".

An IT system prevents hazardous electric shock by removing the earth from the installation, hence being known as an "unearthed" system. Other common names include a floating system or an isolated system. As an "unearthed" system removes the earth connection between the source and the load, there is no closed circuit for fault current, whether electric shock current or fault over-current, to return to the source of supply. If there is no earth connection, then the fault current is very low, for the only "earth" path is through a capacitance path between the general mass of earth and the metal casing. This gives a very high impedance path and hence very low fault current. The fault current levels are typically so low as to not pose a risk of electric shock or heating and fire ignition.

Unearthed systems were used in the first half of the $20^{th}$ century to gain the benefit of greater reliability of supply. This reliability arises from the ability to more robustly accommodate faults. For example, a single fault in one part of the distribution network need not shut the power down to the remainder of the network, as there is no fault current to operate an over-current protection device. More recently, IT systems are used less in distribution and more so in installations where reliability of supply is critical. Examples of such installations include industrial installations such as aluminium smelting and semiconductor fabrication plants, hospital operating theatres and certain office buildings.

The unearthed or floating system is able to be used in an installation notwithstanding it is fed from a distribution network having a TN or TT system. It does require, however, that the network and the installation are isolated from each other by an earth-free isolation transformer. Low voltage isolating transformers are referred to as Leakage Protection Devices (LPDs) and are the preferred method of protection over RCDs in operating theaters and areas outlined in Australian and New Zealand standard AS/NZS 3003:2003, which relates to medical wiring.

IT systems suffer from a number of disadvantages. For example, if there occurs a first fault which creates a high impedance path to earth, that first fault is able to exist for a long time without being detected for there is no over-current condition. If there subsequently occurs a second fault that creates a short circuit to earth—which is a likely consequence of the first fault remaining unresolved—there will be a high fault current with all the same touch potential problems as occur in TT and TN system. For this reason International Standard IEC 60364-4-41 requires IT systems to have insulation monitors for providing a visual indication of the presence of the first fault.

International and Australian Standards also limit the use of IT systems to only one item of Class 1 equipment per isolation transformer/generator unless there is additional protection by way of automatic disconnection in case of a fault. Such additional protection includes an RCD. However, RCDs also have disadvantages due to, amongst other things, a reliance on regular trip testing to validate their operation. In some surveys of RCDs in the UK and USA it has been found up to 10% of the RCDs were not in operating condition when tested. Moreover, RCDs rely on having an electrical path to carry the residual current that may be generated. If there is no earth path, the RCD will not have any residual current to operate. For those applications where an earth connection is not established, or not readily available—such as portable electrical generation equipment such as generators and inverters on worksites and temporary locations—the use of RCDs may leave personnel and equipment at risk. Moreover, RCDs are unable to detect DC residual current.

Even where an RCD is correctly installed and operating, and all the preconditions for successful operation are available, the available commercial products are typically slow to operate and allow large fault currents to flow before isolation of the fault occurs. Both the size and duration of these currents greatly increase the risk of electrocution and electrical injury to a person or persons causing or in contact with the fault.

Given the above limitations of RCDs, when use is made of an IT system in an installation, modifications have to be made to allow the RCD to provide the required protection. In effect, this results in the installation being converted from an IT system into a TN system. While some of the reliability benefits are able to be gained following the conversion, it defeats the purpose of the improved safety features for protection of personnel and equipment of having an IT system.

Other protection circuits are also used in a TT EDS, such as a voltage detection safety device (ELCB). These devices were designed primarily for a TT EDS and required an earth path for correct operation. Accordingly, when included in a domestic installation, for example, having an earth electrode, the devices were part of a load circuit that was earthed via that earth electrode. In some jurisdictions, the load circuit was also required to have a second earth electrode grounded approximately 2 meters from the first and which was directly connected to the ELCB itself. For example, see Australian Standard AS3000-1981. This wiring configuration was a partial solution to cure the spurious tripping of the ELCB in response to electrical faults in nearby load circuits such as those of adjacent houses. Other spurious tripping events included power surges or nearby lightning strikes. Other limitations of ELCBs include:

Faults that do not pass through the earth wire to the earth electrode are not detected.

A single building is not easily split into multiple load circuits with independent fault protection.

Being susceptible to false triggering by external voltages carried by infrastructure connected to the earthing system. An example of such infrastructure is metal pipes.

In more recent years, and in an attempt to address the disadvantages mentioned, above, the RCD has generally replaced ELCBs. While an RCD operates on fault current and is regarded as a superior technology it, in turn, and as mentioned above, provides incomplete protection and is also subject to spurious tripping.

SUMMARY OF THE INVENTION

It is an object of the present invention to overcome or ameliorate at least one of the disadvantages of the prior art, or to provide a useful alternative.

According to a first aspect of the invention there is provided a protection system for an IT electrical distribution system having a floating reference conductor and at least two electrical conductors, the protection system including:

at least two input terminals for electrically connecting to an electrical power source that is upstream of the protection system;

at least two output terminals for electrically connecting, via respective electrical conductors, to a load which is downstream of the protection system;

a protection device for electrically connecting one or more of the input terminals to respective output terminals to allow a supply of electrical power from the source to the load, wherein the protection device is responsive to a fault signal for selectively electrically disconnecting at least one of the input terminals from the respective output terminal to prevent the supply of electrical power; and a sentinel unit for selectively generating the fault signal in response to the current in the reference conductor being greater than a predetermined current threshold.

In an embodiment, the protection system includes a housing for containing the terminals and the protection device.

In an embodiment, the housing fully contains the protection device.

In an embodiment, the housing contains the sentinel unit.

In an embodiment, the sentient unit is external to the housing.

In an embodiment, the sentinel unit limits the current in the reference conductor.

In an embodiment, the sentinel unit limits the current in the reference conductor to no more than the predetermined current threshold.

In an embodiment, the predetermined current threshold is less than about 10 mA.

In an embodiment, the predetermined current threshold is less than about 8 mA.

In an embodiment, the sentinel unit draws power from the IT electrical distribution system downstream of the protection device.

According to a second aspect of the invention there is provided a sentinel unit for an IT electrical distribution system having a floating reference conductor and at least two electrical conductors for supplying electrical power from a source, via an electrical protection device, to a load, wherein: the protection device is responsive to a fault signal for electrically isolating the load from the source; and the sentinel unit selectively generates the fault signal in response to the current in the reference conductor being greater than a predetermined current threshold.

In an embodiment, the predetermined current threshold is less than about 10 mA.

In an embodiment, the predetermined current threshold is less than about 5 mA.

In an embodiment, the sentinel unit includes a limiting circuit for limiting the current in the reference conductor.

In an embodiment, the limiting circuit limits the current in the reference conductor to no more than the predetermined current threshold.

In an embodiment, the sentinel unit selectively generates the fault signal in response to the current in the reference conductor being greater than the predetermined current threshold and the voltage in the reference conductor being greater than a predetermined voltage threshold.

In an embodiment, the predetermined voltage threshold is less than about 40 Volts.

In an embodiment, the predetermined voltage threshold is less than about 35 Volts.

In an embodiment, the predetermined voltage threshold is less than about 30 Volts.

In an embodiment, the predetermined voltage threshold is less than a touch potential.

According to a third aspect of the invention there is provided a method for protecting an IT electrical distribution system having a floating reference conductor and at least two electrical conductors, the method including:

electrically connecting at least two input terminals to an electrical power source;

electrically connecting at least two output terminals, via respective electrical conductors, to a load;

electrically connecting one or more of the input terminals to respective output terminals by a protection device for allowing a supply of electrical power from the source to the load, wherein the protection device is responsive to a fault signal for selectively electrically disconnecting at least one of the input terminals from the respective output terminal to prevent the supply of electrical power; and selectively generating the fault signal with a sentinel unit in response to the current in the reference conductor being greater than a predetermined current threshold.

According to a fourth aspect of the invention there is provided a method for monitoring an IT electrical distribution system having a floating reference conductor and at least two electrical conductors for supplying electrical power from a source, via an electrical protection device, to a load, wherein: the protection device is responsive to a fault signal for electrically isolating the load from the source; and the method includes the step of selectively generating the fault signal in response to the current in the reference conductor being greater than a predetermined current threshold.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

BRIEF DESCRIPTION OF THE DRAWINGS

Preferred embodiments of the invention will now be described, by way of example only, with reference to the accompanying drawings in which:

FIG. 9(*b*) is a schematic representation of another example of a source, EDS and load;

FIG. 9(*c*) is a schematic representation of a further example of a source, EDS and load;

FIG. 12 is a schematic representation of an embodiment of the invention deployed with a programmable building management system; and FIG. 13 is a comparison table for characteristics an embodiment of the invention and two prior art devices.

DETAILED DESCRIPTION

Figure 1:
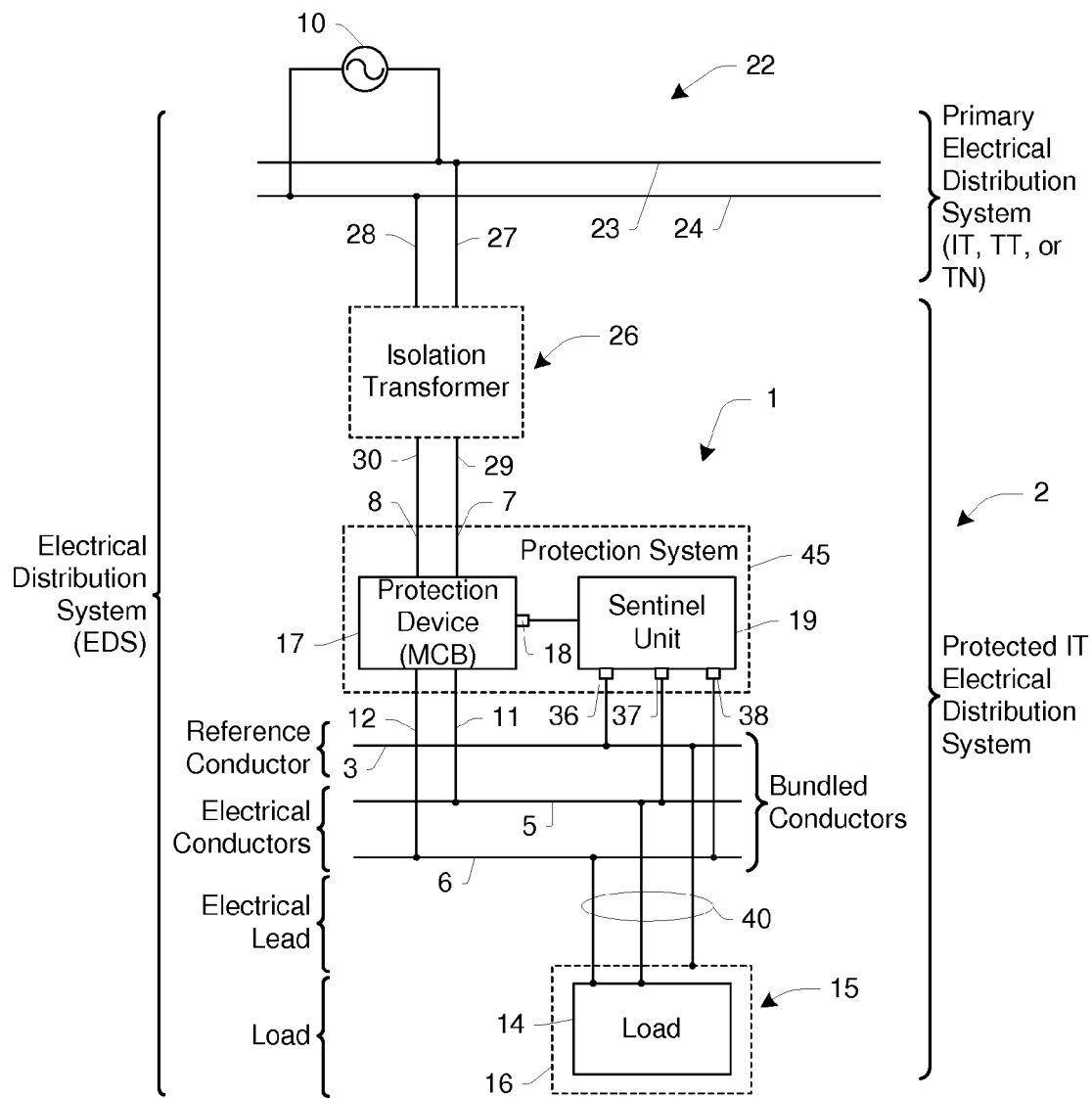
FIG. 1 is a schematic representation of a protection system according to an embodiment of the invention.

Referring to FIG. 1 there is illustrated a protection system 1 for an IT electrical distribution system (EDS) 2. EDS 2 has a floating reference conductor 3 and two electrical conductors in the form of an active conductor 5 and a neutral conductor 6. System 1 includes two input terminals 7 and 8 for electrically connecting to an MEN electrical power source 10 that is upstream of system 1. Two output terminals 11 and 12 are electrically connected, via respective conductors 5 and 6, to an electrical load in the form of an electrical motor 14 for a compressor (not shown) of an upright freezer display 15 having a metal cabinet 16. It will be appreciated that motor 14 is downstream of the system 1. A protection device, in the form of an MCB 17, electrically connects terminals 7 and 8 to respective terminals 11 and 12 to allow a supply of electrical power from source 10 to motor 14. MCB 17 is responsive to a fault signal at a port 18 for selectively electrically disconnecting at least one of terminals 7 and 8 from the respective output terminals 11 and 12 to prevent the supply of electrical power. A sentinel unit 19 selectively generates the fault signal at port 18 in response to the current in conductor 3 being greater than a predetermined current threshold.

Source 10 is a single-phase 50 Hz 240 VAC power source that generates electrical energy and power that is distributed via an MEN electrical distribution system (EDS) 22 having an active conductor 23 and a neutral conductor 24. While, for the sake of clarity, the earth connection has been omitted, it will be appreciated that its inclusion is inherent in any MEN system. Use is made of an earth-less isolation transformer 26 having input terminals 27 and 28 for connecting respective to conductors 23 and 24, and output terminals 29 and 30 for connecting respectively to terminals 7 and 8 of system 1.

In another embodiment, source 10 provides a different supply voltage at a different supply frequency. Supply voltages in the range of about 50 VAC to 260 VAC, and having a frequency in the range of about 10 Hz to 400 Hz, are accommodated by unit 19. In other embodiments where use is made of voltages outside this range, a different sentinel unit is used that is optimized for those voltages.

It will be appreciated by those skilled in the art that EDS 22 is, in other embodiments, other than an MEN system. Other examples include an IT EDS, or a TT EDS. When use is made of other than an MEN system, transformer 26 is omitted.

It will also be appreciated that embodiments of the invention are also applicable to multi-phase electrical distribution systems, and to electrical distribution systems utilizing different supply voltages. Moreover, embodiments of the invention are applicable to a wide range of current loads and applications. While the present embodiment has been developed specifically to accommodate 240 VAC loads of 6 Amps to 63 Amps, other embodiments are designed for other loads.

It has also been found that embodiments of the invention are suitable for use with supply frequencies of other than 50 Hz or 60 Hz. For example, embodiments have been applied to 400 Hz electrical distribution systems such as used in marine and aircraft applications.

Unit 19 includes a sensor port 36 that is directly connected to conductor 3, and an active port 37 and a neutral port 38 that are directly connected to respective conductors 5 and 6. Unit 19 monitors the voltage between ports 36 and 38—and, hence, the voltage between the reference conductor 3 and the neutral conductor 6. If this voltage is sufficient that the current flow in conductor 3 is greater than the predetermined threshold, unit 19 generates the fault signal at port 18, and MCB 17 trips to isolate terminals 11 and 12 from terminals 7 and 8. That is, once MCB 17 trips, load 14 will be disconnected or isolated from the supply of power from source 10.

MCB 17 and unit 19 are typically DIN rail mounted and installed in a switchbox together with any other electrical protection circuits and measurement or monitoring systems in use at the installation. Downstream of MCB 17, conductors 3, 5 and 6 define a protected IT electrical distribution system for the load circuit at the installation. The conductors are bundled together and coextend about the installation. The conductors are electrically connected to the relevant terminals of power outlets within the installation. In this embodiment, use is made of three pin outlets (not shown), where conductors 5 and 6 have the usual connection to the active and neutral terminals of the outlet, while conductor 3 is connected to the remaining terminal, which would conventionally be used as an earth connection. Electrical loads, such as motor 14, are connected electrically with an outlet by way of an electrical lead 40. As shown in FIG. 1, conductor 3 is connected electrically with metal cabinet 16. It will be appreciated that while only a single load and load circuit is illustrated downstream of MCB 17, in other embodiments a plurality of loads and load circuits are included. The single-insulated load or loads will have any metal housing, cabinet or other elements, commonly connected to conductor 3. For double-insulated loads, where a connection is only made to the active and neutral conductor 5 and 6 and not to conductor 3, system 1 still protects against electrical injury, as will be described in more detail below.

System 1 includes a DIN rail mounted housing 45—that is schematically represented in FIG. 1 by a broken line—for containing terminals 7 and 8 and MCB 17. More particularly, housing 45 fully contains MCB 17 and unit 19. In other embodiments, however, unit 19 is disposed external to housing 45.

In this embodiment, the installation is in a retail outlet, and cabinet 16 is used to display frozen goods for sale at that retail outlet. As a matter of normal use, cabinet 16 is physically engaged by both customers and staff of the retail outlet as the frozen goods are taken from and placed within the cabinet, as cleaning occurs, and the like. Accordingly, it is important for the safety of all to ensure that cabinet 16 is not exposed to dangerous or undesirable voltages, and this function is provided by system 1. For example, motor 14 has windings that are insulated. However, this insulation progressively breaks down, and can ultimately result in shorts between windings or voltages being placed on cabinet 16 or other parts of freezer display 15. As cabinet 16 is linked to conductor 3, any voltage on the cabinet—for example, a voltage placed on the cabinet by a person simultaneously touching a faulty but "live" surface of the freezer display 15 with one part of their body and cabinet 16 with another part of their body—will also be present in that conductor. Unit 19 will monitor that voltage and the current it generates in conductor 3. In this embodiment, the predetermined current threshold is about 5 mA and, once this threshold is reached, motor 14 will be isolated from source 10. By using this low current threshold it is possible to isolate the fault while reducing the risk of injury to personnel.

In other embodiments other predetermined current thresholds are used.

However, it is preferred that the threshold be less than 30 mA, and more preferably less than 10 mA. In another specific embodiment, use is made of a predetermined current threshold of about 8 mA, while in another specific embodiment the predetermined current threshold is about 4.5 mA. In other embodiments lower thresholds are used. However, for those domestic deployments which include capacitive elements in EDS 2—for example, extension leads—it has been found that the predetermined current limit should be at least about 4 mA to provide a margin for reducing false triggering of unit 19.

System 1 is configured for fast identification and isolation of a fault downstream of MCB 17. In the FIG. 1 embodiment, system 1 is able to isolate terminals 11 and 12 from terminals 7 and 8 within less than 10 ms of a fault voltage appearing on conductor 3 that gives rise to a current flow in that conductor of about 5 mA. Accordingly, not only is there a low limit to the current that is able to cause an electrical injury, in the event of a fault, that current will only flow for a very short time.

The current able to flow in conductor 3 is, in effect, the fault current, as it is the current that is available to cause injury. In the present embodiment, this current is extremely small and of short duration, and is much smaller than, and independent of, the load current drawn by motor 14. This is distinct from conventional fault currents, which are typically much larger—and necessarily larger than the maximum load current—more difficult to control, and far more dangerous to personnel.

In addition to detecting the current in conductor 3 reaching the predetermined threshold, unit 19 limits that current to the predetermined threshold. That is, during the period between when the fault is detected and when MCB 17 operates to isolate from source 10 the circuit downstream of system 1, the fault current will be contained to no more than about 8 mA. This should be sufficient to prevent electrical injury to any person coming into simultaneous contact with cabinet 16 and any "live" surface.

It will be appreciated by those skilled in the art, that downstream of system 1, EDS 2 is a pure IT EDS. The use of system 1 to provide protection to EDS 2 removes the requirement of the prior art EDS to be converted to an MEN system. This simplifies the required wiring at the installation. Moreover, it removes the variability of protection as dependence upon a good earth connection has been done away with.

Unit 19 draws power from EDS 2 downstream of MCB 17. This has the advantage that unit 19 will only operate and draw power when the load circuit is active. If there is no power connected to the load, unit 19 remains dormant until the power is reapplied. The operation of unit 19 at power-up will be described in more detail below.

In this embodiment, MCB 17 is a 63 Amp 1-pole DIN rail mounted miniature circuit breaker manufactured by Pulset Pty Ltd (see: http://www.pulset.com/) under the model designation MCB6/163. In other embodiments use is made of other protection devices, including other MCBs.

Figure 2:
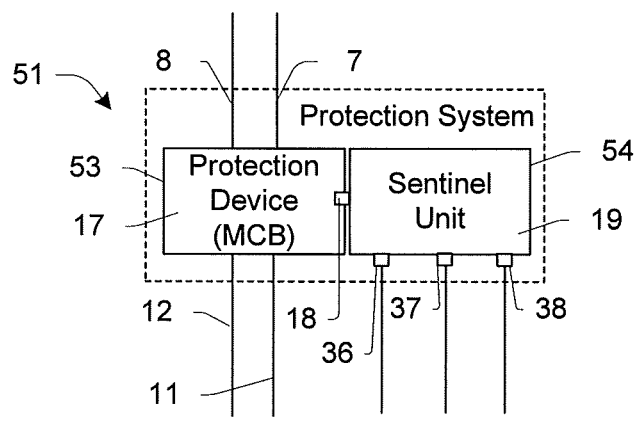
FIG. 2 is a schematic representation of a protection system according to another embodiment of the invention.
Figure 3:
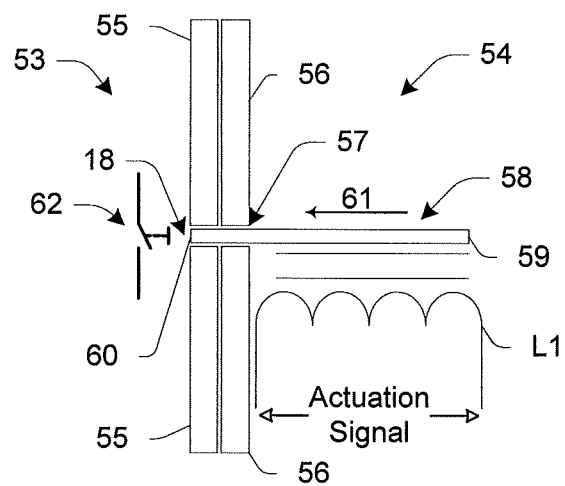
FIG. 3 is a schematic representation of a cross-section of selected components of the MCB and the sentinel unit of FIG. 2.

Another protection system 51 is illustrated in FIG. 2, where corresponding features are denoted by corresponding reference numerals. In particular, system 51 does not include a single housing but, rather, MCB 17 and unit 19 include respective separate DIN rail mounted housings 53 and 54. As best shown in FIG. 3, housings 53 and 54 include respective sidewalls 55 and 56 that are opposed and closely adjacent to each other. MCB 17 and unit 19, in use, are fixedly mounted to a common electrical board in close proximity to each other. However, in other embodiments, MCB 17 and unit 19 are fixedly orientated relative to each other by a frame or other structure. In still further embodiments, MCB 17 and unit 19 are secured to each other by way of a coupling, such as one or more of: screws; nuts and bolts; and adhesive.

Sidewall 56 of housing 54 includes a circular port 57 for movably receiving a cylindrical metal actuator 58 that extends between a first end 59 that is internal to housing 54 and a second end 60 that is external to housing 54.

Sidewall 55 of housing 53 defines port 18 as a circular aperture of substantially the same circumference as port 57 for movably receiving end 60 of actuator 58.

Unit 19 includes an inductor L1 that is selectively energized by an actuation signal. During normal operation the actuation signal is zero or small and the inductor is not energized. As such, actuator 58 remains in the position shown, where end 60 extends through port 57 and port 18 and terminates just inside sidewall 55. Unit 19 is responsive to a fault to provide the actuation signal to energize inductor L1. This, in turn, progresses actuator 58 axially in the direction of arrow 61 such that end 60 mechanically engages and toggles a switch 62 within MCB 17. The MCB 17 is responsive to this toggling of switch 62 to electrically isolate terminals 7 and 8 from terminals 11 and 12 and, hence, interrupt the supply of power from source 10 to motor 14. Once the fault has been removed and inductor L1 is de-energized, actuator 58 returns to the position shown in FIG. 3.

The fault signal in this embodiment is mechanically provided to facilitate the use of existing MCBs in building a protected IT EDS. It will be appreciated that available MCBs have the facility for manual triggering with which unit 19 interacts. Allowing the incorporation of off-the-shelf MCBs with unit 19 facilitates retrofitting of the embodiments of the invention to non-IT installations, and assists with cost containment for retrofitted or newly commissioned installations.

It will be appreciated that FIG. 3 excludes many components that are included within MCB 17 on the basis that these will be understood by those skilled in the art. Particularly, switch 62 is connected to associated circuitry (not shown) that is responsive to the closing of the switch to result in the triggering of MCB 17.

In other embodiments the protection device and the sentinel unit are more fully integrated and contained within a single DIN rail mounted housing. In these other embodiments, the fault signal is one or more of: a mechanical signal; an electrical signal; an optical signal; and another signal.

In a further embodiment, the fault signal provided by the sentinel unit includes two or more separate signals to provide redundancy and to further contribute to the failsafe operation of the sentinel unit and EDS 2.

To ensure quick operation in the presence of a fault condition, unit 19 is highly sensitive to both the voltage and, particularly, the current conditions in conductor 3. While the supply voltage is 240 VAC and the supply current is up to about 100 Amps AC, unit 19 will provide the fault signal when the fault current is no more than about 5 mA AC. Conventional wisdom would suggest that unit 19 would therefore be highly susceptible to false triggering. However, unit 19 includes a transient response circuit (not shown) that allows unwanted transients to be interpreted without a fault signal being generated. Typical transients that are likely to cause transient currents on conductor 2 include capacitive elements in the electrical distribution system 2. For example, it has been found that elements such as lead 40 act as capacitive elements, particularly where the lead is long. There are also other transients, such as a static electricity. All these transients are able to give rise to relatively high voltages on conductor 3, but typically only very small currents. Accordingly, the transient response circuit filters out high frequency voltages to reduce the risk of false triggering.

Another factor allowing unit 19 to be sensitive is that it is monitoring a conductor—that is, conductor 3—that should have little or no current flowing through it during normal operation. This is distinct from conventional fault protection circuitry which more usually monitors the load current and will not trigger until the load current well exceeds the maximum allowable value. As such a maximum value is tens if not many tens of Amps, when a fault occurs personnel are put at considerable risk of death and/or injury.

As EDS 2 is a true IT EDS, any environmentally induced voltages will typically appear substantially equally on all conductors 3, 5 and 6. Accordingly, system 1 is less susceptible to false triggering from those voltages.

Figure 4:
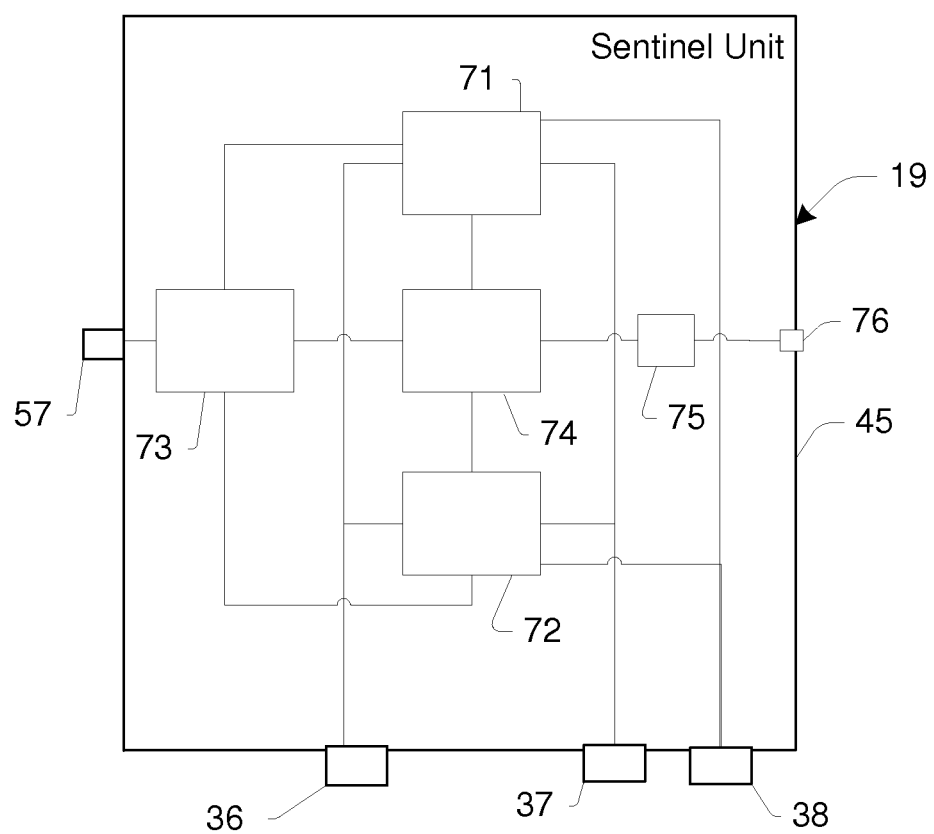
FIG. 4 is an enlarged schematic representation of the sentinel unit of FIG. 2 illustrating the sub-circuits within the unit.
Figure 5:
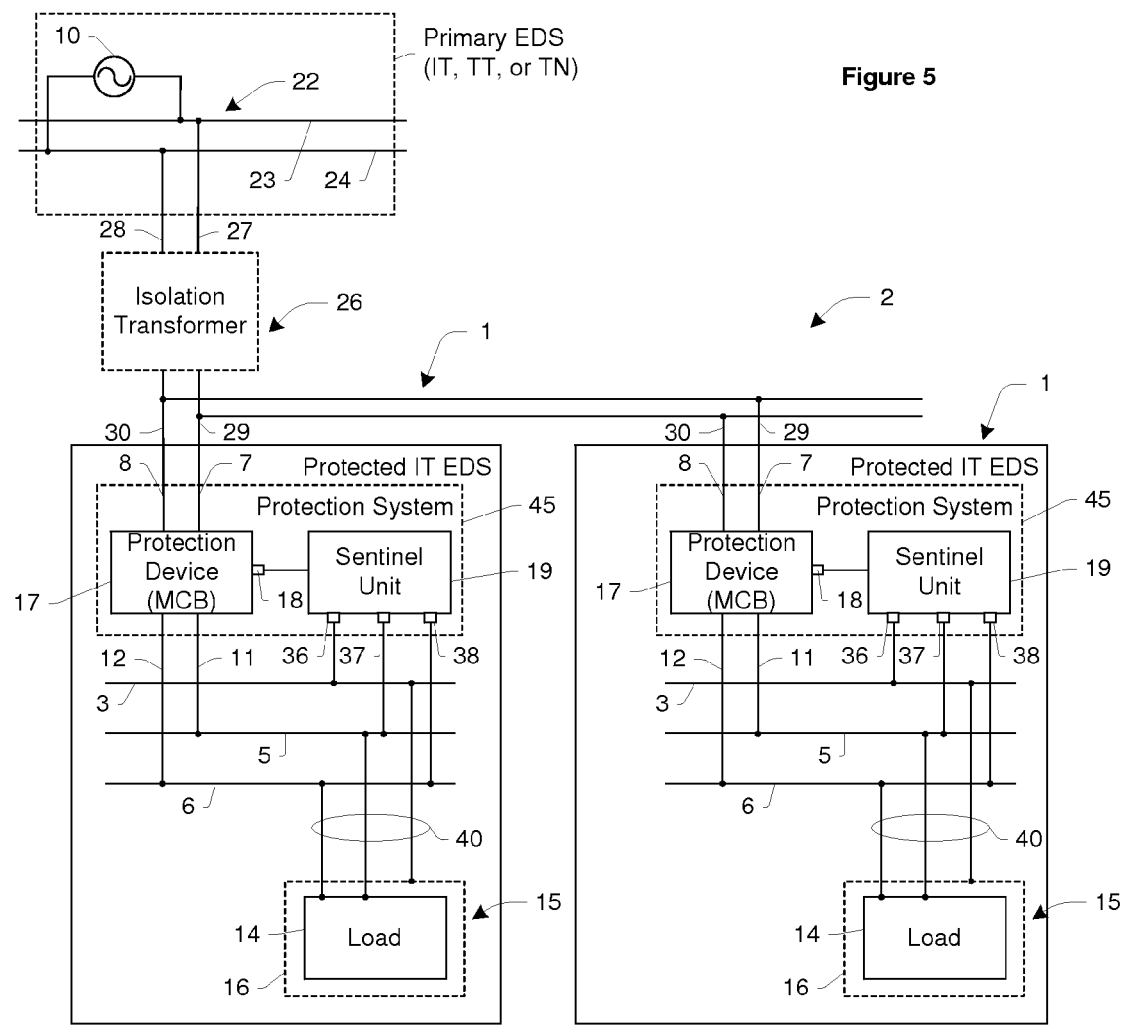
FIG. 5 is a schematic representation of an electrical distribution system including two independently protected load circuits arranged in parallel and both being connected to the power source by a single common isolation transformer.

Reference is now made to FIG. 4 where there is illustrated schematically a more detailed representation of unit 19 where corresponding features are denoted by corresponding reference numerals. Unit 19 includes two monitoring circuits 71 and 72 for respectively monitoring the positive half-wave and the negative half-wave of any AC voltage and current in conductor 3. It will be appreciated that conductor 3 is connected, in use, to port 36 of unit 19. The voltage and current are measured relative to the neutral conductor 6, which is connected to unit 19 at port 38. Unit 19 is also connected, via port 37, to active conductor 5, and circuits 71 and 72, as with the other circuits in unit 19, draw power from conductors 5 and 6.

If either of circuits 71 or 72 detect a current in conductor 3—where the current path is through conductor 3, port 36, either circuit 71 or 72, and to port 38 to conductor 6—which reaches the threshold of 5 mA, that circuit provides an actuation signal. This signal is provided to an actuation circuit 73 that, in turn, provides the fault signal at port 57. As mentioned with reference to FIG. 3, in this embodiment circuit 73 includes inductor L1. In other embodiments, however, different components and combinations of components are used in circuit 73 to receive the actuation signals and to provide the fault signal.

While the actuation signal is generated once the 5 mA threshold is reached, the fault current can rise further prior to MCB 17 disconnecting conductors 5 and 6 from source 10. In this embodiment, unit 19 is configured to limit the fault current to 8 mA at all times. This has to advantage of continually preventing the occurrence of a fault current that would cause muscle contraction. Accordingly, even if a person was part of the current path for the full fault current, that should not be sufficient to cause muscle contraction and the person would not be in this way restrained from being able to push away from the electrically live surface or element. This operation of unit 19 to limit the fault current to 8 mA also provides for the safety of personnel should MCB 17 fail and, hence, following the detection of a fault, not disconnect conductors 5 and 6 from source 10.

It will be appreciated that unit 19 draws power from conductors 5 and 6, which are downstream of the protection device (MCB 17). Accordingly, unit 19 only operates, and only draws power from source 10, when there is power being supplied to conductors 5 and 6.

Unit 19 also includes a control circuit 74 for communicating with circuits 71 and 72 and being selectively responsive to those communications for providing an actuation signal to circuit 73.

Unit 19 also includes a communications module 75 and communications port 76 for allowing selectively communications to and from unit 19. In one embodiment, the communications are with a building management system, while in another embodiment, the communications are with a central controller for a plurality of units 19 that are spaced about the installation. In a further embodiment, unit 19 communicates directly with other sentinel units. For example, in a specific installation, each unit 19 is able to communicate with an immediately upstream sentinel unit. Module 75 communicates with external components via a dedicated communications bus (not shown). This bus is bundled together with the other conductors in EDS 2. In other embodiments, the communication is achieved via one or more of conductors 3, 5 and 6.

In one embodiment, unit 19 is able to provide a communications signal from port 76 to communicate a status for unit 19. For example, that status is able to indicate normal operation, a fault condition, or that the self-policing of the unit has detected a malfunction of one or more of the circuits. In another embodiment, unit 19 includes one or more processors and memory, and the communications are both to and from unit 19 for allowing the memory to be selective read or written to.

In one embodiment, unit 19 includes one or more external status indicators (not shown) for providing a visual display of the status of unit 19. An example of such an indicator includes an array of LEDs mounted to housing 45 and which are driven by circuit 74 to provide the desired display.

The above combination of circuits contributes to a substantially failsafe and a fast operation of unit 19. For example:

The occurrence of a fault on either of the positive half-wave or the negative half-wave will be quickly detected by circuit 71 and 72 respectively.

If one of circuits 71 and 72 fails, the communication with circuit 74 will be interrupted, and circuit 74 will provide an actuation signal to circuit 73.

Circuit 74 provides a periodic test signal to circuit 73 to ascertain its efficacy. If the test signal fails, circuit 74 issues an activation signal and/or communicates an alarm signal via port 76.

Even if circuit 73 is inoperable, unit 19 will continue to limit the fault current to the no more than 8 mA, which is below the point where muscle contraction occurs.

Reference is made to FIG. 13 that compares characteristics of unit 19 of an embodiment of the invention with two prior art devices, an RCD and a GFCI.

Reference is now made to FIGS. 5 to 9 where these is illustrated a number of other embodiments of the invention. The FIG. 5 embodiment is similar to the FIG. 1 embodiment, but includes two load circuits connected in parallel and which are both supplied power from terminals 29 and 30 of transformer 26. Each load circuit includes a respective protection system 1, where each system 1 operates independently to protect the respective load circuits. That is, a fault at one of the loads will only trigger the respective protection device for that load, and not for the other load. This use of multiple protected load circuits being connected to a single common transformer 26 provides considerable advantages over the existing protection systems. It will be appreciated that in another embodiment one or more additional load circuits are in parallel with the illustrated load circuits, where the additional circuit or circuits are independently protected by way of respective protection devices 1.

Figure 6:
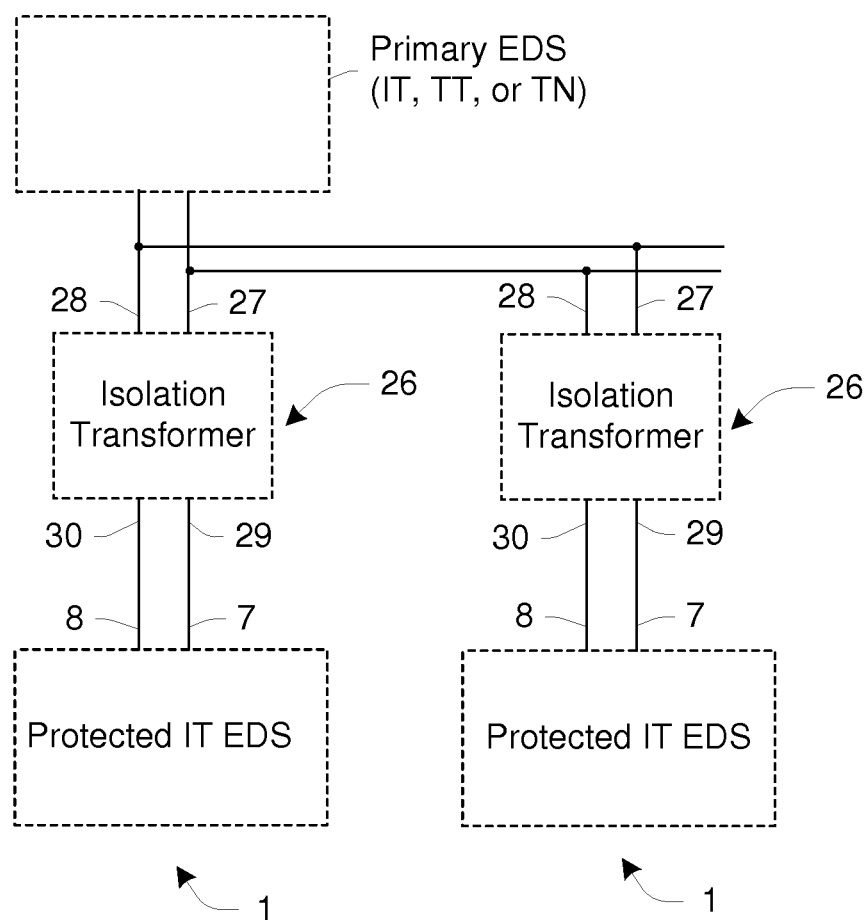
FIG. 6 is a schematic representation of an electrical distribution system including two independently protected load circuits arranged in parallel and both being connected to the power source by respective isolation transformers.

FIG. 6 illustrates a further embodiment, where two isolation transformers are used to supply power from the source to individual protected IT EDSs. For example, where a pseudo IT EDS has been created with an earth link, there will be a separate transformer for each load circuit. It is possible to retrofit a protection device of the invention—and convert the earth to a floating reference—to cost effectively convert the pseudo IT EDS into a true IT EDS having effective protection.

Figure 7:
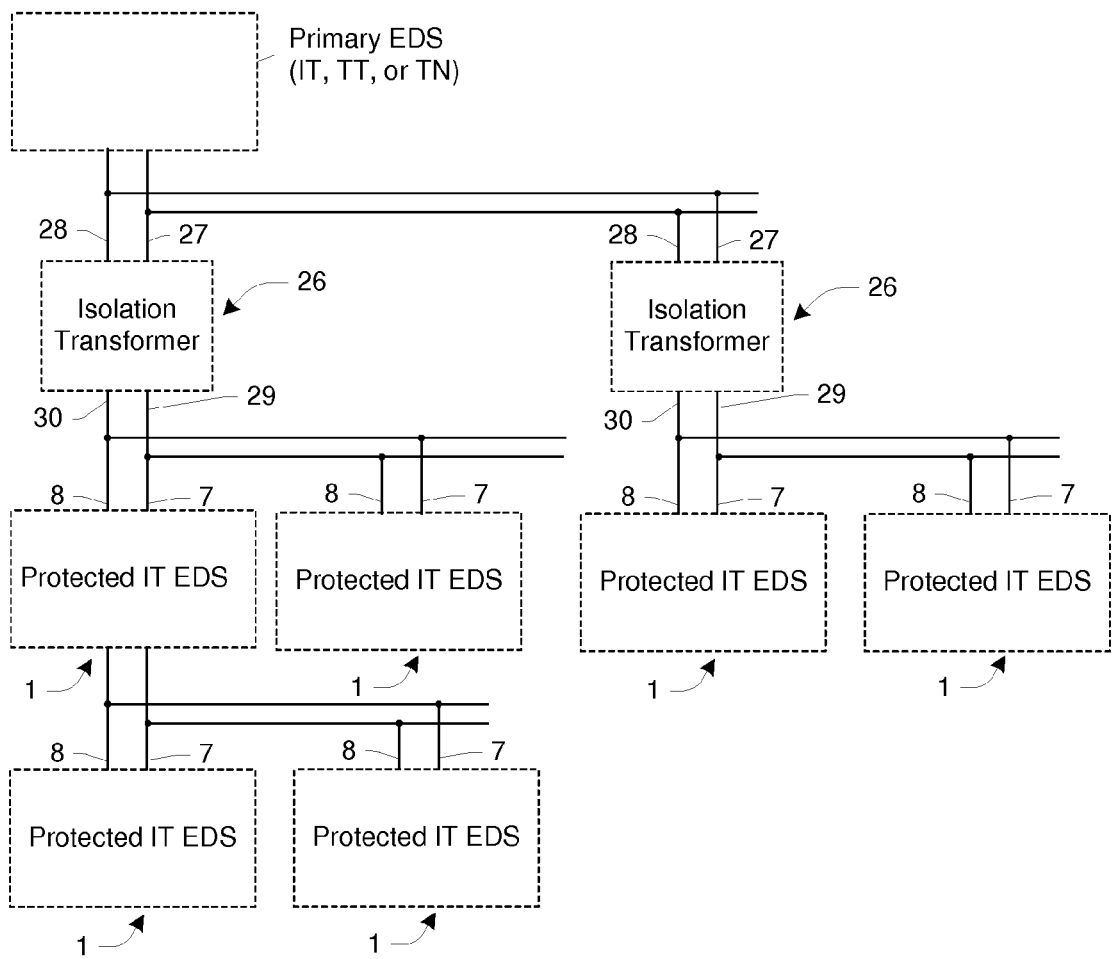
FIG. 7 is a schematic representation of an electrical distribution system including two independently protected load circuits arranged in parallel and both being connected to the power supply by a single common isolation transformer, wherein one of the load circuits includes two nested sub-circuits.
Figure 8:
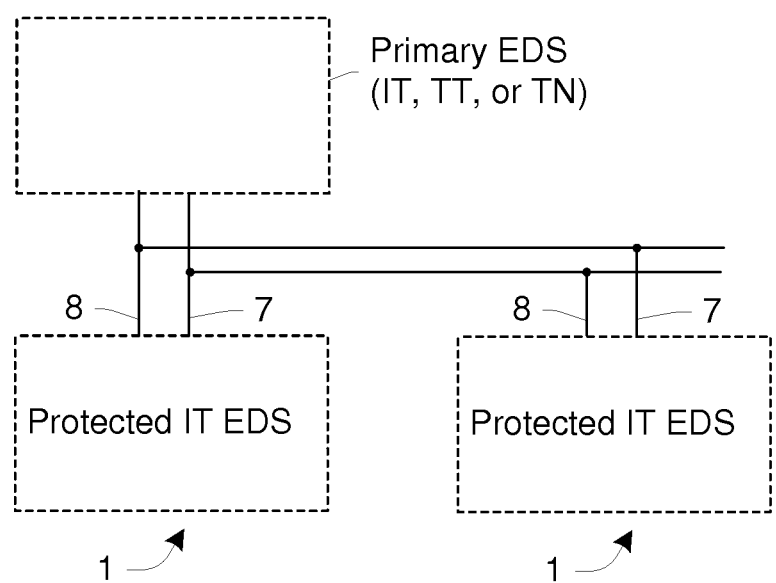
FIG. 8 is a schematic representation of an electrical distribution system including a primary IT EDS for supplying electrical power from the source to two separately and individually protected IT EDSs.

FIG. 7 illustrates a further example of a configuration of load circuits making use of the protection device of the invention. Particularly, it is possible for a single source to supply a plurality of load circuits that are supplied via the same or separate transformers. Moreover, and as illustrated, it is possible to have nested and yet individually and independently protected load circuits.

Where the source is an IT EDS, there is no need to have an isolation transformer between the source and the protected EDS. This arrangement is illustrated in FIG. 8.

Figure 9A:
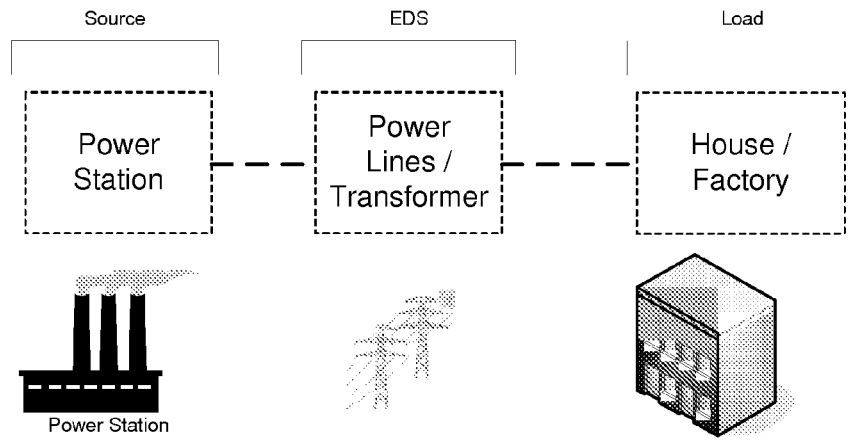
FIG. 9(*a*) is a schematic representation of one example of a source, EDS and load.
Figure 9B:
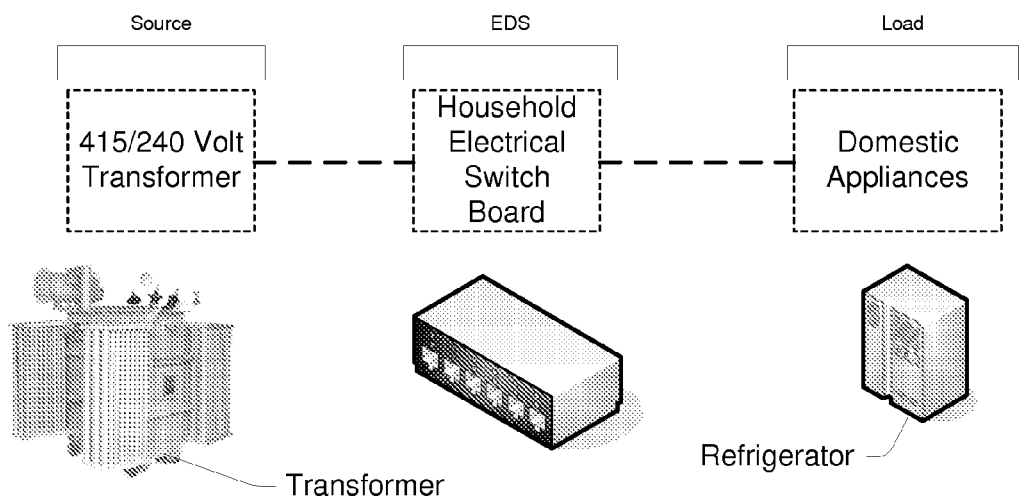
Figure 9C:
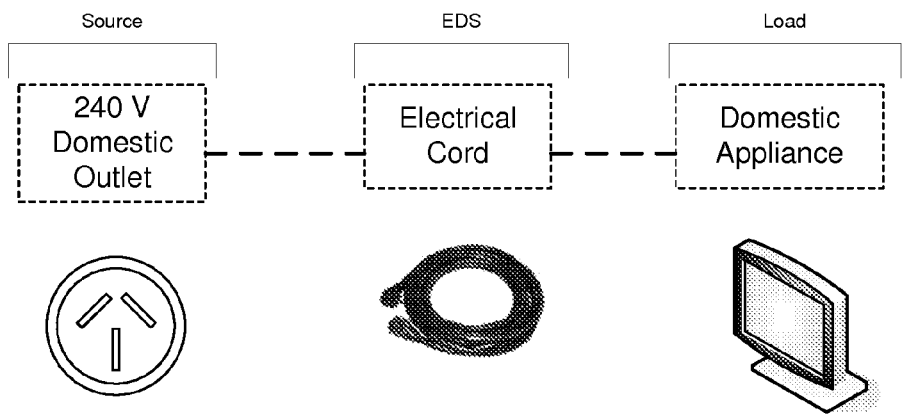

It will be appreciated that the embodiments of the invention are applicable to a wide range of deployments. By way of example, FIG. 9 illustrates a variety of components that are able to be sources, protected EDSs and loads. In different embodiments, a component can have different roles. For example, in one embodiment a line transformer defines the source—that is, the protection device is disposed downstream of the transformer—while in another embodiment the transformer defines part of the load—that is, the protection device is disposed upstream of the transformer.

Some embodiments are deployed in load circuits for UPS systems. For example, those power supplies for IT server rooms, critical manufacturing processes, hospital wards and/or operating theatres; amongst others. Other embodiments are deployed in load circuits having switch-mode power supplies. For example, power control systems that are systematically turning units ON/OFF to prevent voltage and/or current surges in the load. This is relevant particularly to inductive loads, such as motors.

Other embodiments are deployed in load circuits for: multi-storey buildings with air-conditioning units; manufacturing plants with many motors; and large generator systems.

Further embodiments are deployed in load circuits having auxiliary power supplies.

Deployments of the embodiments also include:
Hospitals.
Protection in Body Protected Areas and Cardiac Protected Areas. AS/NZS3003.
Fault monitoring and alarm systems.
Mining operations.
Washeries.
Floating system for all above ground applications.
Process Manufacturing.
Supermarkets.
Critical circuit fault monitoring integrated with BMS or to ethernet touchscreen monitor.
Reliable safe power supply to refrigeration units.
Ships, Marine industry and Offshore Platforms.
Fault detection and fault monitoring in IT systems.
Emergency Services.
Broadcast and data.
Removal of earth provides removal of electrical interference with safety.
Defence and aerospace.
Portable generators and inverters.
Domestic.

An example of a deployment with a programmable building management system is illustrated in FIG. 13. In that Figure, protection system 1 is designated as "iFS" which is nomenclature used by the applicant in relation to an embodiment of the invention.

The embodiments of the invention allow for one or more of:

A single isolation transformer for multiple load circuits.
A true IT EDS: which is particularly relevant to generators, inverters and other mobile equipment that presently require earth stakes for the prior art protection devices to properly function.
Each mains power outlet is able to be separately protected by a protection device of the invention. This, in turn, provides for ease of diagnostics, and less downtime being required to find and remedy an electrical fault.
Capacitive transients to be dissipated prior to personnel being exposed to them, and without causing false triggering of the protection circuit.
Isolation of only the load circuit where a fault occurs.
Effective operation over a wide supply voltage range. As unit 19 operates effectively within the voltage range of about 50 to 280 VAC it is, unlike prior art RCD's, not effected by typical over-voltage and under-voltage conditions. These conditions occur, for example, during a black-out/brown/out, and during the changeover to a UPS. Under these conditions a prior art RCD's will often isolate the load circuit, whereas unit 19 does not, even if the supply voltage falls to zero.
An EDS that does not require an earth connection to provide effective protection to personnel from electrical shock and electrocution.

Advantages of the embodiments include:
A large reduction and, in some deployments, an elimination of the spurious tripping events.

A reduce susceptibility to tripping due to lightning events.

The ability to provide a protected load circuit independently of the quality or nature of the surrounding building materials or construction techniques used.

A reduced risk of causing a fire, as arcing is avoided.

A minimal fault current—in the order of 10 mA—due to an absence of a reference to earth.

Increase electrical protection to both people and equipment.

It will be appreciated that the embodiments of the invention use a floating reference—for example, conductor 3—and their function is not reliant upon an earth path. The floating reference is bonded or otherwise electrically connected with the frame or other exposed conductive elements of each piece of equipment in the load circuit. Accordingly, the sentinel unit monitors any change in voltage to the frame and, when required, immediately isolates the load circuit.

Figure 10:
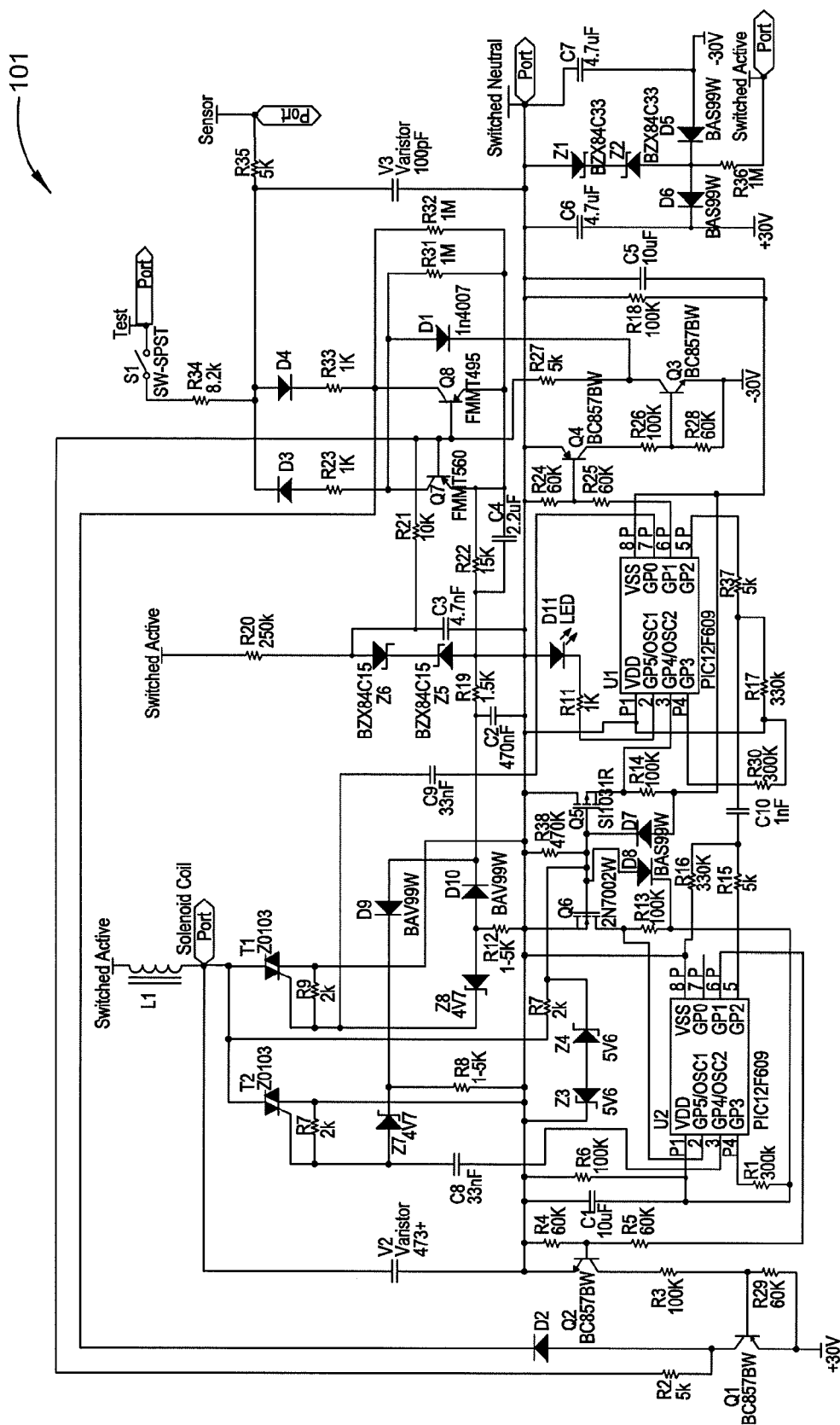
FIG. 10 is a detailed schematic representation of the electronic components within a sentinel unit of one of the preferred embodiments of the invention.
Figure 11:
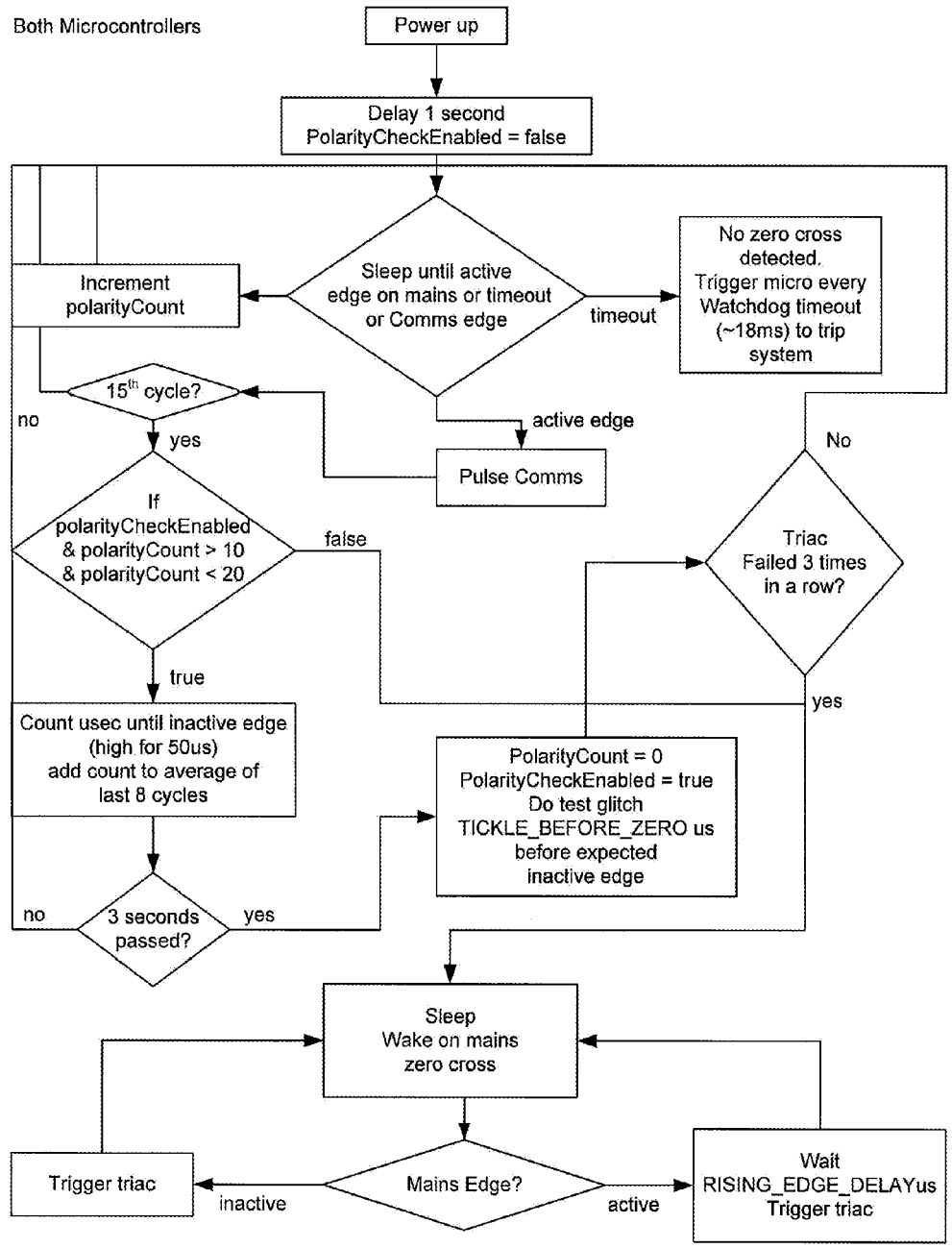
FIG. 11 is a flowchart providing an overview of the operation of the microprocessors included in the circuit of FIG. 10.

Reference is now made to FIG. 10 where there is illustrated a schematic representation of a circuit 101 of a sentinel unit of an embodiment of the invention. The Figure shows the specific nature and arrangement of electronic components within circuit 101. The actual components used in the illustrated configuration are set out in the tables below, and are identified by the reference indicia used in FIG. 10.

| Printed Resistors | | | | |
|---|---|---|---|---|
| # | Value | Tol | Ink | Comments |
| R1 | 300 k | Wide | 100 k | |
| R2 | 5 k | 2% | 10 k | Match with R21 |
| R3 | 100 k | 20% | 100 k | |
| R4 | 60 k | 20% | 100 k | |
| R5 | 60 k | 20% | 100 k | |
| R6 | 100 k | 20% | 100 k | |
| R7 | 2 k | 2% | 1 k | |
| R8 | 1 k-5 k | | 1 k | Active trim |
| R9 | 2 k | 2% | 1 k | |
| R10 | 1Meg | 20% | 100 k | |
| R11 | 1 k | 5% | 1 k | |
| R12 | 1 k-5 k | | 1 k | Active trim |
| R13 | 100 k | 5% | 100 k | |
| R14 | 100 k | 5% | 100 k | |
| R15 | 5 k | 2% | 10 k | Match with R37 |
| R16 | 330 k | 2% | 10 k | |
| R17 | 330 k | 2% | 10 k | |
| R18 | 100 k | 20% | 100 k | |
| R19 | 1.5 k | 1% | 1 k | |
| R20 | 250 k | 20% | 100 k | |
| R21 | 10 k | 2% | 10 k | Match with R2, R27 |
| R22 | 15 k | 2% | 10 k | |
| R23 | 1 k | 20% | 1 k | |
| R24 | 60 k | 20% | 100 k | |
| R25 | 60 k | 20% | 100 k | |
| R26 | 100 k | 20% | 100 k | |
| R27 | 5 k | 2% | 10 k | Match with R21 |
| R28 | 60 k | 20% | 100 k | |
| R29 | 60 k | 20% | 100 k | |
| R30 | 300 k | Wide | 100 k | |
| R31 | 1Meg | 20% | 100 k | |
| R32 | 1Meg | 20% | 100 k | |
| R33 | 1 k | 20% | 1 k | |
| R35 | 5 k | 20% | 1 k | |
| R36 | 1Meg | 20% | 100 k | |
| R37 | 5 k | 2% | 10 k | Match with R15 |
| R38 | 470 k | 20% | 100 k | |

| Semiconductors and Diodes | | |
|---|---|---|
| # | Part | Package |
| D1/D2 | RR274EA-400 | Small |
| D3/D4 | RR274EA-400 | Small |
| D5/D6 | BAV99W | SOT323 |
| D7/D8 | BAV99W | SOT323 |
| D9/D10 | BAV99W | SOT323 |
| D11 | Bright LED (red) discrete | |
| Z1 | BZX84C33W | SOT323 |
| Z2 | BZX84C33W | SOT323 |
| Z3 | BZX84C5V6W | SOT323 |
| Z4 | BZX84C5V6W | SOT323 |
| Z5 | BZX84C15W | SOT23 |
| Z6 | BZX84C15W | SOT23 |
| Z7 | BZX84C4V7W | SOT323 |
| Z8 | BZX84C4V7W | SOT323 |

| Transistors and Triacs | | |
|---|---|---|
| # | Part | Package |
| Q1 | BC857BW | SOT323 |
| Q2 | BC847BW | SOT323 |
| Q3 | BC847BW | SOT323 |
| Q4 | BC857BW | SOT323 |
| Q5 | SI 1031R | small |
| Q6 | 2N7002W | SOT323 |
| Q7 | FMMT560 | SOT23 |
| Q8 | FMMT459 | SOT23 |
| T1 | Z0103 | D-pack |
| T2 | Z0103 | D-pack |

| Integrated Circuits | |
|---|---|
| # | Part |
| U1 | PIC12F609 |
| U2 | PIC12F609 |

| Surface Mount Capacitors | | |
|---|---|---|
| # | Value | Size |
| C1 | 10 uF | 0603 |
| C2 | 0.47 uF | 0603 |
| C3 | 4.7 nF | 0603 |

| Surface Mount Capacitors | | |
|---|---|---|
| # | Value | Size |
| C4 | 2.2 uF | 0805 |
| C5 | 10 uF | 0603 |
| C6 | 4.7 uF | 1206 |
| C7 | 4.7 uF | 1206 |
| C8 | 33 nF | 0603 |
| C9 | 33 nF | 0603 |
| C10 | 1 nF | 0603 |

| Varistors | | |
|---|---|---|
| # | Size | Part # |
| V1 | 14 mm | M9SAS431KD14 |
| V2 | 7 mm | V275LA4P |
| V3 | 7 mm | V275LA4P |

The two resistors R8 and R12 are laser trimmed post assembly of the circuit to provide the desired triggering threshold for the sentinel unit. In this specific embodiment, R8 is laser trimmed to progressively increase the resistance of R8 until T2 turns ON with 4.5 mA of positive current. R12 is then laser trimmed until T1 turns ON with 4.5 mA of negative current. This sets the level of current flowing through those resistors that will trigger the respective triacs. This current is practically equivalent to the fault current in conductor 3. While the notional fault current threshold for circuit 101 is 5 mA, the 4.5 mA calibration is used to provide a margin for temperature variability of the triacs. For when circuit 101 is used in lower temperature environments, the triacs often require a slightly higher voltage—and hence a higher fault current—before triggering. Where circuit 101 is intended for deployment in more temperature stable applications, R8 and R12 are trimmed such that the respective triacs turn ON with more than 4.5 mA.

Circuit 101 provides the functionality of unit 19 of FIG. 4 with the exception of the communications module 75.

Circuit 101 provides a number of functions, which are categorized broadly as protection functions, on the one hand, and policing functions, on the other. The protection or monitoring functions are directed to sensing one or more external characteristics to circuit 101, and being responsive to those characteristics for selectively generating the fault signal. The policing or management functions are directed to sensing one or more internal characteristics to circuit 101, and being responsive to those internal characteristics for selectively generating the fault signal.

Circuit 101 is connected to the active and neutral conductors 5 and 6. As these conductors are downstream from the protection device they are both open to be switched between two states, one where they are connected to source 10, and the other where they are disconnected from source 10. Accordingly, these conductors 5 and 6 are referred to respectively as the switched active conductor and the switched neutral conductor or, for short, the switch active and the switched neutral respectively. It will be appreciated that terminals 7 and 8 are continually connected to the source—subject only to any upstream protection device triggering—via conductors 23 and 24, which are referred to simply as the active conductor and the neutral conductor respectively.

In circumstances where conductors 5 and 6 are disconnected from source 10, circuit 101 will not be powered and, hence, will not be operating. Upon connection of conductors 5 and 6 with source 10, circuit 101 will quickly power up—within a few milliseconds—and thereafter commence and continually perform the policing functions. Importantly, while there is a short delay in the policing functions being provided, circuit 101 will provide the required protection functions at all times, including during the transitory power-up phase.

Circuit 101 includes considerable symmetry and redundancy to contribute to a fast and reliable operation. This speed and reliability is relevant to both the policing functions and the protection functions and to the overall failsafe characteristics offered by circuit 101.

Turning to circuit 101, it will be appreciated that:

The label "Port" adjacent to the switched active in the bottom right-hand side of FIG. 10 corresponds to port 37 of FIG. 1.

The label "Port" adjacent to the switched neutral in the centre right-hand side of FIG. 10 corresponds to port 38 of FIG. 1.

The labels "Port" and the adjacent label "Sensor" in the top right-hand side of FIG. 10 correspond to port 36 and conductor 3 of FIG. 1.

The voltage on conductor 5—that is, the switched active—is applied to one side of R20 and, due to the operation of diodes Z6 and Z7 in combination, provide a ±15 V square wave voltage signal at the junction of R20 and Z6. This square wave is applied, via R21, to the base of transistors Q7 and Q8. In the positive and negative half-cycles of the square wave, Q8 and Q7 respectively are conductive and act (in combination with the associated components) to limit current in those half-cycles. The current that is limited is that current that flows from conductor 3, through the respective transistors Q8 and Q7, and to the switched neutral.

Due to the biasing of Q7 and Q8, any current flow in conductor 3 appears as a modified sine wave current through resistors R22 and R19. In this circuit, it is the sizing of R19 that provides critical value for determining the limited of the current in conductor 3. Accordingly, the resistance of R19 is selected to provide the desired maximum current at the likely maximum voltage to be experienced by the circuit in normal conditions. For a normal AC voltage of 240 V, R19 is selected with a value of 1.5 kOhm so that the maximum fault current—that is, the maximum current in conductor 3—is limited to 8 mA. In other embodiments using different current limits and/or different voltages, the resistance of R19 is selected accordingly.

The capacitor C4 is placed in parallel with R22 such that, during a fault condition, the sine wave current is shaped to both reduce the average current flowing through Q7 and Q8 and retain the peak current value. This has a number of advantages. Firstly, by reducing the average current through transistors Q7 and Q8 it is possible to use smaller and faster transistors. In the context of circuit 101, where all the components are contained on a single circuit board having a footprint of 1 inch×0.825 inch, the ability to use smaller transistors is significant. Second, the fault current—that is, the current flowing through conductor 3 and which personnel are exposed to—will also be limited to a 5 mA peak and a lower average current than a pure sine wave.

The capacitor C3 helps to reduce the impact of transient voltages. Typically, these voltages will only have a short duration and will not give rise to large current flows. However, these voltages are often a source of false triggering in prior art devices. For circuit 101, when a transient voltage appears on the switched active, R20 and C3 offer a relatively low impedance path for the resultant current to flow to the switched neutral. The higher the frequency of the transient current, the less impedance that will be offered by C3. If the high frequency voltage across C3 increases greatly, then Z5 and Z6 will also conduct to provide a further low impedance path for the transient current.

The capacitor C2 also acts to improve the performance of circuit 101 with transients. While C3 offers a low impedance path for the transient current to prevent it having an impact upon any fault current, C2 functions primarily to filter the current flowing internally within circuit 101—and in particular the current flowing through R7 and R9—to reduce the risk of false triggering of the triacs T1 and T2. This capacitor has the effect of shorting to the neutral any high frequency currents that exist on conductor 3 and which are, as a result, flowing though resistor R19.

The current that flows through R19 in the positive half-cycle will also flow through D9, Z7 and R7 and then to the switched neutral. In the negative half-cycle the current will instead flow through D10, Z8 and R9 and then to the switched neutral. If the magnitude of this current is greater than 4.5 mA, the voltage across R7, in the positive half-cycle, and R9, in the negative half-cycle, will be sufficient to trigger triacs T2 and T1 respectively. A triggering of either of these triacs will effective short the lower end of solenoid coil L1 to the switched neutral and cause the coil to become energized with the full mains voltage. This will result in the fault signal being generated as described above, for example, with reference to FIG. 2.

As both the positive and negative half-cycles are independently monitored, the fault signal is able to be provided extremely quickly once a fault condition is sensed. It is enough that only one of triacs T1 and T2 is switched for the fault signal to be produced.

If the triggering of one of the triacs occurs very late in the half-cycle, it is possible that coil L1 will not be energized sufficiently to create the fault signal. But at that time the voltage on the switched active will be low and, hence, any personnel should be at low risk of an electric shock. As most faults occur in both half-cycles, even if a fault is not provided in the first half-cycle, it will in the subsequent half-cycle.

It has been found that circuit 101, in combination with a . . . MCB provides an average switching time of less than 10 ms when in use with a 50 Hz 240 VAC supply source. It will be appreciated that a half-cycle for such a supply source is 10 ms.

If one of the triacs T1 or T2 were to fail, a fault condition would still result in the other switching and, hence, a fault signal would still be generated. In this instance, it would be thought that the response time of circuit 101 and the subsequent triggering of MCB will take slightly longer. However, circuit 101 includes additional components to provide the testing and policing functions, and one of these functions is to regularly test triacs T1 and T2. If one of the triacs fails while a fault is present, circuit 101 operates to trigger the other triac during both half-cycles to compensate for the failed triac. Accordingly, the fault signal generates just as effectively. Additionally, if one triac fails the test and a fault condition is not present, circuit 101 directly generate a fault signal by triggering the other triac. These functions will be described in further detail below.

After assembly of circuit 101, and prior to deployment, a positive DC reference voltage is placed at the junction of C4 and R22 while R8 is laser trimmed until T2 triggers. Then, a negative DC reference voltage of the same magnitude is placed at the junction of C4 and R22 while R12 is laser trimmed until T1 triggers. The accuracy of the laser trimming is therefore tailored for the specific circuit and contributes to an extremely reliable and repeatable operation of the triacs and, hence, an extremely reliable and repeatable operation of circuit 101 in providing the fault signal.

Resistor R10 has a dual function, one of which is to enable a power supply to the microprocessor U1 and U2, and the other is to provide a timing signal to those microprocessors to indicate the zero crossing point of the voltage on the switched active.

R10 connects the switched active to the junction of the gates of Q5 and Q6. During the positive half-cycle, current will flow through R8 and then through two paths defined, on the one hand, by D8 and C1/R6, and on the other hand by Z4 and Z3. This combination provides a power supply to pin 1 ($V_{DD}$) of microprocessor U2. During the negative half-cycle, current will flow through R8 and then through two paths defined, on the one hand, by D7 and C5/R18, and on the other hand by Z4 and Z3. This combination provides a power supply to pin 8 ($V_{SS}$) of microprocessor U1.

The voltage at the junction of R10 and the gates of Q5 and Q6 switches those transistors to provide respective signals to pin 3 of U1 and pin 2 of U2. This signal provides U1 and U2 with an indication of the zero-crossing point of the voltage of the switched active. This timing indicator is used by the microprocessors, and will be described in more detail below.

The circuitry centred about diodes Z1 and Z2 is a power supply for providing a ±30 V power rails. These rails are used within circuit 101 primarily to assist with the policing functions and, particularly, to bias the internal transistor circuits so that the testing is able to occur. For example, It will be appreciated by those skilled in the art that when a triac, such as T1 or T2, is triggered or switched ON—that is, switched to a low-resistive state following the application of a voltage between the gate and the main terminal—the voltage drop across between the main terminals is relatively small. It will also be appreciated that once the current between the main terminals falls below a threshold—as will occur for a zero DC offset mains supply sine wave signal—the triac will turn OFF and there will be, effectively, on open circuit between the main terminals. These characteristics of a triac are used within circuit 101 to provide part of the policing function. Particularly, the biasing circuitry for the policing function includes transistors Q1, Q2, Q3 and Q4. Q1 and Q2 operate to bias the base and collector of transistor Q8, while Q3 and Q4 operate to bias the base and collector of Q7.

Microprocessors U1 and U2 use the zero-crossing signal—as supplied to pin 3 of U1 and pin 2 of U2—to respectively generate bias signals at pins 6 that are applied to the bases of Q4 and Q2 during the positive and negative half-cycles. The bias signals are not applied during every half-cycle, but only once every 2 or 3 seconds. These signals are timed to be late in the respective half-cycles in which they occur, and typically within the last millisecond of the half-cycle. With the bias applied to the relevant transistors, the microprocessors U1 and U2, late in the respective half-cycles, trigger respective triacs T1 and T1 by generating trigger signals at pin 7 of U1 and pin 3 of U2 which are then applied to the gates of T1 and T2. These trigger signals, while being sufficient to trigger the respective triacs, are timed for when the resultant current flow through coil L1 will be so small that L1 will not be energized and a fault signal will not be generated. Notwithstanding, the triggering of a triac will result in the junction of R1 and T1/T2 being connected to the active neutral, and hence, a voltage drop will appear at the gates of Q5 and Q6 which will be detected, via resistors R13 and R14 by U2 and U1 respectively. If the relevant triac does not trigger, the voltage drop will not appear at the gates of Q5 and Q6, and U2 and U1 will not detect any change.

If a triac is tested to be operating correctly, the microprocessor that conducted that test will communicate the positive result to the other microprocessor by a control sub-circuit formed by R15, R16, R17, R37, C10 and the microprocessors themselves. As successive successful test are communicated, microprocessor U1 pulses pin 2 with the result that D11 emits a periodic flash.

If, for example, triac T2 failed a test, microprocessor U2 would not provide a confirmation signal to U1. U2 would then progress to administer a further like test to T2 at the next scheduled time for such a test. If, after three such tests the result was still negative—in that U1 had still not received a confirmation signal via the control sub-circuit—then U2 will, via pin 3, provide a series of pulses spaced by 3 ms to ensure triac T2 is triggered and, if necessary, retriggered. (For the triac will turn OFF once the supply voltage passes into the next half cycle.) If triac T2 is operating normally it will provide a low impedance and solenoid L1 will quickly become energized. Simultaneously, U1 will switch T1 ON—through the application of a series of electrical pulses to the gate of T1 via C9. The result being that a fault signal is generated as at least T1 and likely T1 and T2 will be ON. During the period of the confirmatory testing—typically about ten seconds—but prior to the fault signal being generated, the rate of flashing of D11 will decrease. Once the fault signal has been generated, D11 will cease flashing, as circuit 101 will be isolated from the power source.

Solenoid L1 only requires about a quarter cycle of energisation to trigger MCB 17. In other embodiments, more sensitive solenoids are used to provide quicker switching times.

The microprocessors also monitor the timing of successive zero-crossing signals and, in an absence of such signals for more than three seconds, cause a fault signal to be generated.

Circuit 101 has many features that provide for failsafe operation. Some of these features go to internal monitoring, and others to the detection of the fault, and protection of the load circuit to prevent high fault currents even if circuit 101 fails to correctly function. For example:

If either one of the microprocessors fails, there will be no communication between them confirming the successful testing of the triacs, and the other microprocessor will cause a fault signal to be generated within about ten seconds. In the intervening period, the functioning microprocessor will continue to provide protection to the load should a fault occur, as both triacs are able to be controlled to switch (by the relevant microprocessor) in both directions.

If either one of triacs T1 and T2 fails, there will be an absence of full communication between the microprocessors to confirm the successful testing, and the microprocessor controlling the functioning triac will cause a fault signal to be generated within about ten seconds. In the intervening period, the functioning triac microprocessor will continue to provide protection to the load should a fault occur, as the remaining triac is able to be controlled to switch (by the relevant microprocessor) in both directions.

In the event the solenoid coil L1 fails by going open circuit, a fault signal will generate, as the zero-crossing signal will disappear.

In the event the solenoid coil L1 fails by shorting, circuit 101 will not be able to function to provide the fault signal and the MCB or other protection device will not move to isolate the load from the supply. However, during this time, circuit 101 continues to operate to limit any fault current—that is, the current in conductor 3—to less than 8 mA.

Detection of a fault condition occurs quickly for monitoring occurs on both the positive and negative half-cycles.

The reference for determining a fault condition is a floating conductor 3 that should be at a low potential relative to the switched neutral. The sentinel unit connects conductor 3 to the switched neutral and monitors any voltage between the two that gives rise to a current flow of about 5 mA. The use of a zero-reference—that is the voltage and current between conductor 3 and the switched neutral—allows circuit 101 to be fast acting and accurate.

At power-up, the current limiting functionality of circuit 101 operates immediately should a fault be present.

The microprocessors provide the policing function of circuit 101 and, should it be found that key components of circuit 101 are faulty or not correctly operating, a fault signal is provided.

If both microprocessors fail, it is only the policing function that will cease. Circuit 101 will continue to monitor the load circuit and, in the event of a fault, will limit the fault current. (In the above embodiments, the fault current is limited to 8 mA).

The preferred embodiments of the invention provide for a protected IT EDS. The EDS is a true IT EDS, as an earth connection is not required. This is distinct from a prior art pseudo IT EDS which must include an earth connection or the protection system—typically including one or more RCDs—will not operate, and the prior art EDS will be unprotected.

The preferred embodiments of the invention also allow a plurality of separately protected load circuits to be supplied from a single isolation transformer. This allows, particularly for large installations, for a reduction in the quantum and cost of the associated infrastructure while increasing the protection available to property and personnel.

A further advantage of the preferred embodiments is that the sentinel unit continually monitors the load circuit it is associated with and, upon detection of a fault, automatically actuates the associated protection device—which, in FIG. 1 is an MCB. That is, there is no requirement for manual monitoring or manual intervention to isolate the load circuit.

A further advantage of the sentinel unit of the preferred embodiments is that it is able to be nested with other sentinel units to protect individual sub-circuits of a given load circuit. It has been found that because the predetermined current thresholds are low, the sentinel unit immediately upstream of the fault provides the fault signal and isolates the relevant sub-circuit prior to any upstream sentinel units doing so. Accordingly, only the sub-circuit where the fault occurs is isolated from the power source, and the remaining sub-circuit or sub-circuits are able to continuing operating normally. It is presently understood that this sequence of operation in a nested configuration of sentinel units is contributed to by: the low fault currents being considered; the resistance in the reference conductor; and the capacitance of the bundled conductor.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagrams only show a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media; a medium bearing a propagated signal detectable by at least one processor of one or more processors and representing a set of instructions that, when executed, implement a method; a carrier wave bearing a propagated signal detectable by at least one processor of the one or more processors and representing the set of instructions a propagated signal and representing the set of instructions; and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term electrically connected, when used in the claims, should not be interpreted as being limited to direct connections only. The terms "connected" and "coupled", along with their derivatives, may be used. It should be understood that these terms are not intended as synonyms for each other. Thus, the scope of the expression a device A electrically connected to a device B should not be limited to devices or systems wherein an output of device A is directly electrically connected to an input of device B. It means that there exists an electrical path between an output of A and an input of B which may be a path including other devices or means. "Connected" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A protection system for an IT electrical distribution system having a floating reference conductor and at least two electrical conductors, the protection system including:
   at least two input terminals for electrically connecting to an electrical power source that is upstream of the protection system;
   at least two output terminals for electrically connecting, via respective electrical conductors, to a load which is downstream of the protection system;
   a protection device for electrically connecting one or more of the input terminals to respective output terminals to allow a supply of electrical power from the source to the load, wherein the protection device is responsive to a fault signal for selectively electrically disconnecting at least one of the input terminals from the respective output terminal to prevent the supply of electrical power; and
   a sentinel unit for selectively generating the fault signal in response to a high impedance low current fault indicated by the current in the reference conductor being greater than a predetermined current threshold wherein the predetermined current threshold is less than about 10 mA.

2. A protection system according to claim 1 including a housing for containing the terminals and the protection device.

3. A protection system according to claim 2 wherein the housing fully contains the protection device.

4. A protection system according to claim 2 wherein the housing contains the sentinel unit.

5. A protection system according to claim 2 wherein sentient unit is external to the housing.

6. A protection system according to claim 1 wherein the sentinel unit limits the current in the reference conductor.

7. A protection system according to claim 6 wherein the sentinel unit limits the current in the reference conductor to no more than the predetermined current threshold.

8. A protection system according to claim 1 wherein the predetermined current threshold is less than about 8 mA.

9. A protection system according to claim 1 wherein the sentinel unit draws power from the IT electrical distribution system downstream of the protection device.

10. A protection system according to claim 1 wherein the predetermined current threshold is less than about 5 mA.

11. A protection system according to claim 1 wherein the sentinel unit selectively generates the fault signal in response to the current in the reference conductor being greater than the predetermined current threshold and the voltage in the reference conductor being greater than a predetermined voltage threshold.

12. A protection system according to claim 11 wherein the predetermined voltage threshold is less than about 40 volts.

13. A protection system according to claim 11 wherein the predetermined voltage threshold is less than about 35 volts.

14. A protection system according to claim 11 wherein the predetermined voltage threshold is less than about 30 volts.

15. A protection system according to claim 11 wherein the predetermined voltage threshold is less than a touch potential.

* * * * *

UNITED STATES PATENT AND TRADEMARK OFFICE
CERTIFICATE OF CORRECTION

| | | |
|---|---|---|
| PATENT NO. | : 8,953,295 B2 | Page 1 of 1 |
| APPLICATION NO. | : 13/140756 | |
| DATED | : February 10, 2015 | |
| INVENTOR(S) | : David Paul Jankowski et al. | |

It is certified that error appears in the above-identified patent and that said Letters Patent is hereby corrected as shown below:

In the Claims

Column 26, Lines 32-33, Claim 5:

After "according to claim 2 wherein"
Delete "sentient unit" and
Insert -- sentinel unit --.

Signed and Sealed this
Ninth Day of June, 2015

Michelle K. Lee
*Director of the United States Patent and Trademark Office*